United States Patent
Lempel et al.

(10) Patent No.: US 8,417,693 B2
(45) Date of Patent: Apr. 9, 2013

(54) ENFORCING NATIVE ACCESS CONTROL TO INDEXED DOCUMENTS

(75) Inventors: Ronny Lempel, Haifa (IL); Todd Leyba, Potomac, MD (US); John A. McPherson, Jr., San Jose, CA (US); Justo Luis Perez, Salinas, CA (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 11/182,334

(22) Filed: Jul. 14, 2005

(65) Prior Publication Data

US 2007/0016583 A1    Jan. 18, 2007

(51) Int. Cl.
G06F 17/30 (2006.01)
G06F 7/00 (2006.01)

(52) U.S. Cl. .................. 707/722; 707/709; 707/781

(58) Field of Classification Search .............. 707/3
See application file for complete search history.

(56) References Cited

U.S. PATENT DOCUMENTS

| | | |
|---|---|---|
| 4,965,763 A | 10/1990 | Zamora |
| 5,187,790 A | 2/1993 | East et al. |
| 5,265,221 A | 11/1993 | Miller |
| 5,287,496 A | 2/1994 | Chen et al. |
| 5,297,039 A | 3/1994 | Kanaegami et al. |
| 5,423,032 A | 6/1995 | Byrd et al. |
| 5,574,906 A | 11/1996 | Morris |
| 5,638,543 A | 6/1997 | Pedersen et al. |
| 5,664,172 A | 9/1997 | Antoshenkov |
| 5,685,003 A | 11/1997 | Peltonen et al. |
| 5,701,469 A | 12/1997 | Brandli et al. |
| 5,708,825 A | 1/1998 | Sotomayor |
| 5,721,938 A | 2/1998 | Stuckey |
| 5,721,939 A | 2/1998 | Kaplan |
| 5,724,033 A | 3/1998 | Burrows |
| 5,729,730 A | 3/1998 | Wlaschin et al. |
| 5,745,889 A | 4/1998 | Burrows |
| 5,745,890 A | 4/1998 | Burrows |
| 5,745,894 A | 4/1998 | Burrows et al. |
| 5,745,898 A | 4/1998 | Burrows |

(Continued)

FOREIGN PATENT DOCUMENTS

| | | |
|---|---|---|
| EP | 0 809 197 | 11/1997 |
| EP | 0809197 A2 | 11/1997 |

(Continued)

OTHER PUBLICATIONS

Lee et al., "Secure Knowledge Management and The Semantic Web," Communications of the ACM, Dec. 2005.*

(Continued)

*Primary Examiner* — Kuen Lu
*Assistant Examiner* — Rachel J Lee
(74) *Attorney, Agent, or Firm* — Janaki K. Davda; Konrad, Raynes, Davda & Victor LLP

(57) ABSTRACT

Techniques are provided for processing a search request. One or more indexed levels of access control list information are stored in a search index for each document identified in the search index. An interim result set is generated by matching the one or more indexed levels of access control list information associated with each said document to one or more security groups associated with the search request. A final result set is generated from the interim result set by performing impersonation.

33 Claims, 8 Drawing Sheets

U.S. PATENT DOCUMENTS

| | | | |
|---|---|---|---|
| 5,745,899 A | 4/1998 | Burrows | |
| 5,745,900 A | 4/1998 | Burrows | |
| 5,745,904 A | 4/1998 | King et al. | |
| 5,745,906 A | 4/1998 | Squibb | |
| 5,765,149 A | 6/1998 | Burrows | |
| 5,765,150 A | 6/1998 | Burrows | |
| 5,765,158 A | 6/1998 | Burrows | |
| 5,765,168 A | 6/1998 | Burrows | |
| 5,778,378 A | 7/1998 | Rubin | |
| 5,787,435 A | 7/1998 | Burrows | |
| 5,797,008 A | 8/1998 | Burrows | |
| 5,809,502 A | 9/1998 | Burrows | |
| 5,832,480 A | 11/1998 | Byrd, Jr. et al. | |
| 5,832,500 A | 11/1998 | Burrows | |
| 5,832,519 A | 11/1998 | Bowen et al. | |
| 5,848,407 A | 12/1998 | Ishikawa et al. | |
| 5,852,820 A | 12/1998 | Burrows | |
| 5,862,325 A | 1/1999 | Reed et al. | |
| 5,864,863 A | 1/1999 | Burrows | |
| 5,873,097 A | 2/1999 | Harris et al. | |
| 5,884,305 A | 3/1999 | Kleinberg et al. | |
| 5,890,103 A | 3/1999 | Carus | |
| 5,893,119 A | 4/1999 | Squibb | |
| 5,903,646 A | 5/1999 | Rackman | |
| 5,903,891 A | 5/1999 | Chen et al. | |
| 5,903,901 A | 5/1999 | Kawakura et al. | |
| 5,909,677 A | 6/1999 | Broder et al. | |
| 5,914,679 A | 6/1999 | Burrows | |
| 5,915,251 A | 6/1999 | Burrows et al. | |
| 5,920,859 A | 7/1999 | Li | |
| 5,924,091 A | 7/1999 | Burkhard | |
| 5,933,822 A | 8/1999 | Braden-Harder et al. | |
| 5,963,940 A | 10/1999 | Liddy et al. | |
| 5,963,954 A | 10/1999 | Burrows | |
| 5,966,703 A | 10/1999 | Burrows | |
| 5,966,710 A | 10/1999 | Burrows | |
| 5,970,497 A | 10/1999 | Burrows | |
| 5,974,412 A | 10/1999 | Hazlehurst et al. | |
| 5,995,980 A | 11/1999 | Olson et al. | |
| 6,005,503 A | 12/1999 | Burrows | |
| 6,016,493 A | 1/2000 | Burrows | |
| 6,016,501 A | 1/2000 | Martin et al. | |
| 6,021,409 A | 2/2000 | Burrows | |
| 6,026,388 A | 2/2000 | Liddy et al. | |
| 6,026,413 A | 2/2000 | Challenger et al. | |
| 6,029,165 A | 2/2000 | Gable | |
| 6,035,268 A | 3/2000 | Carus et al. | |
| 6,047,286 A | 4/2000 | Burrows | |
| 6,067,543 A | 5/2000 | Burrows | |
| 6,078,914 A | 6/2000 | Redfern | |
| 6,078,916 A | 6/2000 | Culliss | |
| 6,078,923 A | 6/2000 | Burrows | |
| 6,088,694 A | 7/2000 | Burns et al. | |
| 6,105,019 A | 8/2000 | Burrows | |
| 6,119,124 A | 9/2000 | Broder et al. | |
| 6,122,626 A | 9/2000 | Brandsma | |
| 6,182,062 B1 | 1/2001 | Fujisawa et al. | |
| 6,182,121 B1 | 1/2001 | Wlaschin | |
| 6,192,258 B1 | 2/2001 | Kamada et al. | |
| 6,192,333 B1 | 2/2001 | Pentheroudakis | |
| 6,205,451 B1 | 3/2001 | Norcott et al. | |
| 6,205,456 B1 | 3/2001 | Nakao | |
| 6,216,175 B1 | 4/2001 | Sliger et al. | |
| 6,233,571 B1 | 5/2001 | Egger et al. | |
| 6,243,713 B1 | 6/2001 | Nelson et al. | |
| 6,243,718 B1 | 6/2001 | Klein et al. | |
| 6,269,361 B1 | 7/2001 | Davis et al. | |
| 6,278,992 B1 | 8/2001 | Curtis et al. | |
| 6,285,999 B1 | 9/2001 | Page | |
| 6,295,529 B1 | 9/2001 | Corston-Oliver et al. | |
| 6,308,179 B1 | 10/2001 | Peterson et al. | |
| 6,324,566 B1 | 11/2001 | Himmel et al. | |
| 6,336,112 B2 | 1/2002 | Chakrabarti et al. | |
| 6,336,117 B1 | 1/2002 | Massarani | |
| 6,336,122 B1 | 1/2002 | Lee et al. | |
| 6,339,772 B1 | 1/2002 | Klein et al. | |
| 6,349,308 B1 | 2/2002 | Whang et al. | |
| 6,374,268 B1 | 4/2002 | Testardi | |
| 6,381,602 B1 * | 4/2002 | Shoroff et al. | 707/9 |
| 6,385,616 B1 | 5/2002 | Gardner | |
| 6,418,433 B1 | 7/2002 | Chakrabarti et al. | |
| 6,421,655 B1 | 7/2002 | Horvitz et al. | |
| 6,457,018 B1 | 9/2002 | Rubin | |
| 6,463,439 B1 | 10/2002 | Dahlberg | |
| 6,507,846 B1 | 1/2003 | Consens | |
| 6,519,592 B1 | 2/2003 | Getchius et al. | |
| 6,519,593 B1 | 2/2003 | Matias et al. | |
| 6,519,597 B1 | 2/2003 | Cheng et al. | |
| 6,529,285 B2 | 3/2003 | Bobrow et al. | |
| 6,542,906 B2 | 4/2003 | Korn | |
| 6,547,829 B1 | 4/2003 | Meyerzon et al. | |
| 6,553,385 B2 | 4/2003 | Johnson et al. | |
| 6,567,804 B1 | 5/2003 | Ramasamy et al. | |
| 6,578,032 B1 | 6/2003 | Chandrasekar et al. | |
| 6,584,458 B1 | 6/2003 | Millett et al. | |
| 6,594,682 B2 | 7/2003 | Peterson et al. | |
| 6,615,209 B1 | 9/2003 | Gomes et al. | |
| 6,618,725 B1 | 9/2003 | Fukuda et al. | |
| 6,622,211 B2 | 9/2003 | Henry et al. | |
| 6,631,369 B1 | 10/2003 | Meyerzon et al. | |
| 6,631,496 B1 | 10/2003 | Li et al. | |
| 6,633,872 B2 | 10/2003 | Ambrosini et al. | |
| 6,643,650 B1 | 11/2003 | Slaughter et al. | |
| 6,658,406 B1 | 12/2003 | Mazner et al. | |
| 6,658,423 B1 | 12/2003 | Pugh et al. | |
| 6,665,657 B1 | 12/2003 | Dibachi | |
| 6,665,666 B1 | 12/2003 | Brown et al. | |
| 6,678,409 B1 | 1/2004 | Wu et al. | |
| 6,754,873 B1 | 6/2004 | Law et al. | |
| 6,763,362 B2 | 7/2004 | McKeeth | |
| 6,766,316 B2 | 7/2004 | Caudill et al. | |
| 6,789,077 B1 | 9/2004 | Slaughter et al. | |
| 6,810,375 B1 | 10/2004 | Ejerhed | |
| 6,839,665 B1 | 1/2005 | Meyers | |
| 6,839,702 B1 | 1/2005 | Patel et al. | |
| 6,839,843 B1 | 1/2005 | Bacha et al. | |
| 6,842,730 B1 | 1/2005 | Ejerhed et al. | |
| 6,845,009 B1 | 1/2005 | Whitted | |
| 6,850,979 B1 | 2/2005 | Saulpaugh et al. | |
| 6,865,575 B1 | 3/2005 | Smith et al. | |
| 6,868,447 B1 | 3/2005 | Slaughter et al. | |
| 6,870,095 B1 | 3/2005 | Whitted | |
| 6,877,136 B2 | 4/2005 | Bess et al. | |
| 6,904,454 B2 | 6/2005 | Stickler | |
| 6,906,920 B1 | 6/2005 | Whitted | |
| 6,934,634 B1 | 8/2005 | Ge | |
| 7,031,954 B1 * | 4/2006 | Kirsch | 707/3 |
| 7,051,023 B2 | 5/2006 | Kapur et al. | |
| 7,243,301 B2 | 7/2007 | Bargeron et al. | |
| 7,318,075 B2 | 1/2008 | Ashwin et al. | |
| 7,693,824 B1 | 4/2010 | Diament | |
| 2001/0027451 A1 | 10/2001 | Taguchi et al. | |
| 2001/0049671 A1 | 12/2001 | Joerg | |
| 2002/0006112 A1 | 1/2002 | Jaber et al. | |
| 2002/0032677 A1 | 3/2002 | Morgenthaler et al. | |
| 2002/0032705 A1 | 3/2002 | Higashiyama et al. | |
| 2002/0065957 A1 | 5/2002 | Rubin | |
| 2002/0099723 A1 | 7/2002 | Garcia-Chiesa | |
| 2002/0120685 A1 | 8/2002 | Srivastava et al. | |
| 2002/0129014 A1 | 9/2002 | Kim et al. | |
| 2002/0129015 A1 | 9/2002 | Caudill et al. | |
| 2002/0165707 A1 | 11/2002 | Call | |
| 2002/0169770 A1 | 11/2002 | Kim et al. | |
| 2002/0174149 A1 | 11/2002 | Conroy et al. | |
| 2002/0188615 A1 | 12/2002 | Latarche et al. | |
| 2003/0028564 A1 | 2/2003 | Sanfilippo | |
| 2003/0046311 A1 | 3/2003 | Baidya et al. | |
| 2003/0055626 A1 | 3/2003 | Miyahira et al. | |
| 2003/0093409 A1 | 5/2003 | Weil et al. | |
| 2003/0163454 A1 | 8/2003 | Jacobsen et al. | |
| 2003/0177127 A1 | 9/2003 | Goodwin et al. | |
| 2003/0182282 A1 | 9/2003 | Ripley | |
| 2003/0187833 A1 | 10/2003 | Plu | |
| 2003/0217052 A1 | 11/2003 | Rubenczyk et al. | |
| 2003/0225763 A1 | 12/2003 | Guilak et al. | |
| 2003/0225779 A1 | 12/2003 | Matsuda | |
| 2003/0229604 A1 | 12/2003 | Zaragoza et al. | |

| | | | |
|---|---|---|---|
| 2004/0078356 | A1 | 4/2004 | Mazner et al. |
| 2004/0078387 | A1 | 4/2004 | Benjamin et al. |
| 2004/0078753 | A1 | 4/2004 | Doyle |
| 2004/0098399 | A1 | 5/2004 | Risberg et al. |
| 2004/0111408 | A1 | 6/2004 | Caudill et al. |
| 2004/0123104 | A1 | 6/2004 | Boyen et al. |
| 2004/0128615 | A1 | 7/2004 | Carmel et al. |
| 2004/0162997 | A1 | 8/2004 | Hopmann et al. |
| 2004/0215606 | A1 | 10/2004 | Cossock |
| 2004/0230598 | A1 | 11/2004 | Robertson et al. |
| 2004/0243554 | A1 | 12/2004 | Broder et al. |
| 2004/0243556 | A1 | 12/2004 | Ferrucci et al. |
| 2004/0243557 | A1 | 12/2004 | Broder et al. |
| 2004/0243560 | A1 | 12/2004 | Broder et al. |
| 2004/0243581 | A1 | 12/2004 | Weissman et al. |
| 2004/0243645 | A1 | 12/2004 | Broder et al. |
| 2005/0033745 | A1 | 2/2005 | Wiener et al. |
| 2005/0044411 | A1 | 2/2005 | Somin et al. |
| 2005/0120004 | A1 | 6/2005 | Stata et al. |
| 2005/0144241 | A1 | 6/2005 | Stata et al. |
| 2005/0149499 | A1 | 7/2005 | Franz et al. |
| 2005/0149576 | A1 | 7/2005 | Marmaros et al. |
| 2005/0149851 | A1 | 7/2005 | Mittal |
| 2005/0165718 | A1 | 7/2005 | Fontoura et al. |
| 2005/0165781 | A1 | 7/2005 | Kraft et al. |
| 2005/0165800 | A1 | 7/2005 | Fontoura et al. |
| 2005/0165838 | A1 | 7/2005 | Fontoura et al. |
| 2005/0198076 | A1 | 9/2005 | Stata et al. |
| 2006/0047825 | A1* | 3/2006 | Steenstra et al. ............. 709/229 |
| 2006/0074962 | A1 | 4/2006 | Fontoura et al. |
| 2007/0198456 | A1* | 8/2007 | Betz et al. ......................... 707/1 |
| 2007/0271268 | A1 | 11/2007 | Fontoura et al. |
| 2007/0282829 | A1 | 12/2007 | Fontoura et al. |
| 2008/0294634 | A1 | 11/2008 | Fontoura et al. |
| 2008/0301130 | A1 | 12/2008 | Fontoura et al. |

FOREIGN PATENT DOCUMENTS

| | | |
|---|---|---|
| EP | 0809197 A2 | 11/1997 |
| JP | 9311870 A | 12/1997 |
| JP | 10289246 | 10/1998 |
| JP | 10293767 | 11/1998 |
| JP | 2000339309 | 12/2000 |
| JP | 2002163276 | 6/2002 |
| WO | 9749048 | 12/1997 |

OTHER PUBLICATIONS

PCT International Search Report and Written Opinion, Oct. 30, 2006, for International Application No. PCT/EP2006/064281.

EP Office Action, Dec. 28, 2007, for EP Application No. 05701609.9-2201, 6 pp.

Lu, W., L. Chien, & H. Lee, "Anchor Text Mining for Translation of Web Queries", Proceedings of the IEEE International Conference on Data Mining, 2001, pp. 401-408.

Agarwal, R.C. "A Super Scalar Sort Algorithm for RISC Processors", Proceedings of the 1996 ACM SIGMOD International Conference on Management of Data, 1996, pp. 240-246.

Arpaci-Dusseau, A.C., R.H. Arpaci-Dusseau, D.E. Culler, J.M. Hellerstein, and D.A. Patterson, "High Performance Sorting on Networks of Workstations", Proceedings of the 1996 ACM SIGMOD International Conference on Management of Data, 1997, 12 pp.

Baeza-Yates, R. and B. Ribeiro-Neto, "Modern Inforamtion Retrieval", England: Pearson Education Limited, 1999, Ch. 8 & Ch. 13, 29 pp.

Broder, A.Z., S.C. Glassman, M.S. Manasse, and G. Zweig, "Syntactic Clustering of the Web", Computer Networks and ISDN Systems, vol. 29, Iss. 8-13, 1997, pp. 1157-1166.

Brown, E., J.P. Callan, and W.B. Croft, "Fast Incremental Indexing for Full-Text Information Retrieval", Proceedings of the 20th International Conference on Very Large Data Bases, 1994, pp. 192-202.

Callan, J.P., W.B. Croft, and S.M. Harding, "The Inquery Retrieval System", Proceedings of the 3rd International Conference on Database and Expert Systems Applications, 1992, pp. 78-83.

Clarke, C.L.A., G.V. Cormack, and F.J. Burkowski, "Shortest Substring Ranking (MultiText Experiments for TREC-4)", Proceedings of the Fourth Text Retrieval Conference, Nov. 1995, pp. 1-10.

Corme, T.H., C.E. Leiserso, R.L. Rives, and C. Stei, "Introduction to Algorithms", Cambridge: The MIT Press, Second Edition, 2003, Chapter 8, 22 pp.

Dieberger, A. and D.M. Russell, "Context Lenses—Document Visualization and Navigation Tools for Rapid Access to Detail", Human-Computer Interaction Interact '01, Jul. 2001, pp. 545-552.

French, G., "Hacking the Google Numrange Operator", [online], Apr. 1, 2004, [retrieved on Aug. 31, 2004], retrieved from the Internet at <URL: http://www.webpronews.com/insiderreports/searchinsider/wpn-49-20040401HackingtheGoogleNumrangeOperator.html>.

Google, "Advanced Search", [online], 2003, [retrieved on Aug. 31, 2004], retrieved from the Internet at <URL: http://www.google.com/help/refinesearch.html>.

Hardman, L. "Links in Hypermedia: the Requirement for Context", Proceedings of the 5th ACM Conference on Hypertext, Nov. 1993, pp. 183-191.

Kaindl. H., S. Kramer, and L.M. Afonso, "Combining Structure Search and Content Search for the World-Wide Web," Proceedings of the 9TH ACM Conference on Hypertext and Hypermedia, 1998, pp. 217-224.

Lim, L., M. Wang, S. Padmanabhan, J.S. Vitter, and R. Agarwal, "Dynamic Maintenance of Web Indexes Using Landmarks", Proceedings of the 12th International Conference on World Wide Web, 2003, pp. 102-111.

Long, X and T. Suel. "Optimized Query Execution in Large Search Engines with Global Page Ordering", Proceedings of the 29th VLDB Conference, 2003, 12 pp.

Lu, W., L. Chien, and H. Lee, "Anchor Text Mining for Translation of Web Queries", Proceedings of the 2001 IEEE International Conference on Data Mining, 2001, pp. 401-408.

Lu, Z, "Scalable Distributed Architectures for Information Retrieval", Dissertation, May 1999, 178 pages.

Macurious Software Foundation, "Macurious Spider Frequently Asked Questions 3.0", [online] [retrieved on Oct. 8, 2003], retrieved from the Internet at <URL: http://www.macurious.com/spider/faq.htm>.

Melnik, S., S. Raghavan, B. Yang, and H. Garcia-Molina, "Building a Distributed Full-Text Index for the Web", Proceedings of the 10th International Conference on World Wide Web, 2001, pp. 396-406.

Miscellaneous Articles from Newsgroups, Available from: (1) Newsgroups:google.public.support.general; Date: Jul. 5, 2002 and Jul. 6, 2002; (2) Newsgroups: comp.protocols.tcp-ip.domains; Date Apr. 8, 2000; (3) Newsgroups: micorsoft.public.frontpage.client; Date: Mar. 18, 1999 [3 entries] and Mar. 19, 1999 and (4) Newsgroups:alt.internet.search-engines; Date: Jan. 26, 2002, 3 pp.

PCT International Search Report and Written Opinion, May 6, 2005, for International Application No. PCT/EP2005/050321.

Pearson, P.K., "Fast Hashing of Variable Length Text Strings", Communications of the ACM, Jun. 1990, vol. 33, No. 6, pp. 677-680.

Sedgewick, R., "Algorithms in C++. Parts 1-4." Boston: Addison-Wesley Publishing Co., 1998, Chapter 10, pp. 417-433 & 436-450.

Tomasic, A., H. Garcia-Molina, and K. Shoens, "Incremental Updates of Inverted Lists for Text Document Retrieval", Nov. 18, 1993, pp. 1-43.

Tomasic, A., and H. Garcia-Molina, "Performance of Inverted Indices in Shared-Nothing Distributed Text Document Information Retrieval Systems", Proceedings of the 2nd International Conference on Parallel and Distributed Information Systems, Jan. 1983, 11 pp.

U.S. Appl. No. 11/295,397, filed Dec. 5, 2005, entitled "Improving Text Search Quality by Exploiting Organizational Information", invented by T. Hampp, M. Baessler, A. Lang, T.W. Goetz, A. Baader, and J. Doerre.

Weinreich, H., H. Obendorf, and W. Lambersdorf, "The Look of the Link—Concepts for the User Interface of Extended Hyperlinks", Proceedings of the 12th ACM Conference on Hypertext and Hypermedia, 2001, pp. 19-28.

Witten, I.H., A. Moffat, and T.C. Bell, "Managing Gigabytes: Compressing and Indexing Documents and Images", San Francisco: Morgan Kaufmann Publishers, 1999, Chapter 5, pp. 223-261.

Zobel, J., S. Heinz, and H.E. Williams, "In-Memory Hash Tables for Accumulating Text Vocabularies", Information Processing Letters, vol. 80, Iss. 6, 2001, pp. 271-277.

Agrawal, S., S Chaudhuri and G. Das, "DBXplorer: A System for Keyword-Based Search over Relational Databases," Proceedings of 18th International Conference on Data Engineering, 2002, 12 pp.

Agrawal, S., S Chaudhuri and G. Das, "DBXplorer: Enabling Keyword Search over Relational Databases", Proceedings of the 2002 ACM SIGMOD International Conference on Management of Data, 2002, p. 627.

Bhalotia, G., A. Hulgeri, C Nakhe, S. Chakrabarti and S. Sudarshan, "Keyword Searching and Browsing in Databases Using BANKS", Proceedings of the 18th International Conference on Data Engineering, 2002, 10 pp.

Brin, S. and L. Page, "The Anatomy of a Large-Scale Hypertextual Web Search Engine", Computer Networks and ISDN Systems, vol. 30, No. 1-7, 1998, pp. 107-117.

Broder, A.Z., D. Carmel, M. Herscovichi, A. Soffer and J. Zien, "Efficient Query Evaluation Using a Two-Level Retrieval Process", Twelfth International Conference on Information Knowledge Management (CIKM 2003), 2003, pp. 426-434.

Bruno, N., K. Koudas and D. Srivastava, "Holistic Twig Joins: Optimal XML Pattern Matching", Proceedings of the 2002 ACM SIGMOD International Conference on Management of Data, 2002, pp. 310-321.

Carmel, D., Y. Maarek, M. Mandelbrod, Y. Mass and A. Soffer, "Searching XML Documents via XML Fragments," Proceedings of the 26th Annual International ACM SIGIR Conference on Research and Development in Information Retrieval, 2003, pp. 151-158.

Fontoura, M., E. Shekita, J. Zien, S. Rajagopalan and A. Neumann, "High Performance Index Build Algorithms for Intranet Search Engines", Proceedings of 30th International Conference on Very Large Data Bases, 2004, pp. 1158-1169.

Gravano, L., P.G. Ipeirotis, N. Koudas and D. Srivastava, "Text Joins in an RDBMS for Web Data Integration", Proceedings of the 12th International Conference on World Wide Web, 2003, pp. 90-101.

Guttman, A., "R-Trees: A Dynamic Index Structure for Spatial Searching", Proceedings of the 1984 ACM SIGMOD International Conference on Management of Data, 1984, pp. 47-57.

Hristidis, V. and Y. Papakonstantinou, "Discover: Keyword Search in Relational Databases", Proceedings of the 28th VLDB Conference, 2002, 12 pp.

Kaushik, R., R. Krishnamurthy, J.F. Naughton and R. Ramakrishnan, "On the Integration of Structure Indexes and Inverted Lists", Proceedings of the 20th International Conference on Data Engineering, 2004, 1 pg.

Melnik, S., S. Raghavan, B. Yang and H. Garcia-Molina, "Building a Distributed Full-Text Index for the Web," ACM Transactions on Information Systems, vol. 19, No. 3, Jul. 2001, pp. 217-241.

Press, W.H., B.P. Flannery, S.A. Teukolsky and W.T. Vetterling, "Numerical Recipes in C: The Art of Scientific Computing", 1998, Ch. 9, pp. 258-263.

Raghavan, S. and H. Garcia-Molina, "Complex Queries over Web Repositories", Proceedings of the 29th VLDB Conference, 2003, pp. 33-44.

Raghavan, S. and H. Garcia-Molina, "Integrating Diverse Information Management Systems: A Brief Survey", IEEE Data Engineering Bulletin, 2001, vol. 24, No. 4, pp. 44-52.

Ramsak, F., V. Markl, R. Fenk, M. Zirkel, K. Elhardt and R. Bayer, "Integrating the UB-Tree into a Database System Kernel", Proceedings of the 26th International Conference on Very Large Data Bases, Sep. 2000, pp. 263-272.

Spertus, E. and L.A. Stein, "Squeal: A Structured Query Language for the Web", Proceedings of the 9th international World Wide Web Conference on Computer Networks, 2000, pp. 95-103.

Lomet, D. (Ed.), "Bulletin of the Technical Committee on Data Engineering", Dec. 2001, vol. 24, No. 4, 56 pp.

U.S. Appl. No. 12/327,777, entitled "System and Program for Handling Anchor Text", filed Dec. 3, 2008, invented by R. Kraft and A. Neumann, 22 pp.

EP Office Action, Jun. 16, 2009, for EP Application No. 06777790.4-1245, 3 pp.

Office Office 1, Jul. 31, 2009, for Application No. CN2006800253422, 6 pp.

Office Office 1, Jul. 31, 2009, for Application No. CN2006800253422, 2 pp. [Translation].

Brin, S. and L. Page, "The Anatomy of a Large-Scale Hypertextual Web Search Enging", Computer Networks and ISDN Systems, vol. 30, No. 1-17, 1998, 20 pp.

Broder, A.Z., S.C. Glassman, M.S. Manasse, and G. Zweig, "Syntactic Clustering of the Web", Computer Networks and ISDN Systems, vol. 29, Iss. 8-13, 1997. Rettrieved on Jul. 21, 2005 from the Internet at <URL: http://www.ra.ethz.ch/CDstore/www6/Technical/Paper205/Paper205.html>, 13 pp.

Brown, E., "Execution Performance Issues in Full-Text Information Retrieval", Technical Report 95-81, Oct. 1995, 179 pp.

Callan, J.P., W.B. Croft, and S.M. Harding, "The Inquery Retrieval System", Proceedings of the 3rd International Conference on Database and Expert Systems Applications, 1992, 9 pp.

Spertus, E. and L.A. Stein, "Squeal: A Structured Query Language for the Web", Proceedings of the 9th International World Wide Web Conference on Computer Networks, 2000, [online], [Retrieved on Sep. 4, 2002]. Retrieved from the Internet at <URL: http://www.9.org/w9cdrom/222/222.html>, 12 pp.

Zobel, J., S. Heinz, and H.E. Williams, "In-Memory Hash Tables for Accumulating Text Vocabularies", Information Processing Letters, vol. 80, Iss. 6, 2001, 9 pp.

Abstract and Machine Translation for JP2002163276, published on Jun. 7, 2002, 31 pp.

English Abstract for JP9311870, published on Dec. 2, 1997, 1 p [has english counterparts EP0809197 & US5848407 discussed in Remarks submitted with this IDS].

Susaki, S. and T. Muramoto, "A New Decision Factor for IR System Extracted from Structure of Hypertexts" Jul. 16, 1999, English abstract begins on line 17, Total 9 pp.

IDS Report, Aug. 27, 2010, from the Aug. 10, 2010 Office Action, Total 3 pp.

Silvestri, F., S. Orlando, and R. Perego, "Assigning Identifiers to Documents to Enhance the Clustering Property of Fulltext Indexes", ACM 2004, Total 8 pp.

Silvestri, F., "High Performance Issues in Web Search Engines: Algorithms and Techniques", May 2004, Total 111 pp.

Shieh, W., Chen, T., and C. Chung, "A Tree-based Inverted File for Fast Ranked-Document Retrieval", Proceedings of the International Conference on Information and Knowledge Engineering, 2003, 6 pp.

EP Office Action, Feb. 2, 2012, for EP Application No. 06777790.4-1243, Total 5 pp.

EP Response, Apr. 23, 2012, for EP Application No. 06777790.4-1243, Total 8 pp.

* cited by examiner

| Search | Advanced | Category Tree | My profile | Help | About |

LDAP login credentials — 410

To log in, type the user ID of an enterprise user.
Distinguished user name as created in your enterprise LDAP server:

uid=varma,cn=Software Engineer,ou=Engineering,O=Venetica,dc=venetica,dc=com —— 412

User password:
●●●●● —— 414

☑ Remember password

[Log In]

Repository login credentials —— 420

Specify the credentials required to log into the configured repositories.

| Enable for search —— 422 | Name —— 424 | User name —— 426 | Password —— 428 |
|---|---|---|---|
| ☐ | ibm | | |
| ☐ | ENTERPRISESEARCH | | |

[Apply]

FIG. 4

ENFORCING NATIVE ACCESS CONTROL TO INDEXED DOCUMENTS

BACKGROUND

1. Field

Embodiments of the invention relate to enforcing native access control to indexed documents.

2. Description of the Related Art

An enterprise may be described as any organization (e.g., business, government entity, charity, etc.) that uses computers. The information found in an enterprise may exist in many shapes and forms. The information may be distributed throughout the enterprise and managed by various software programs, depending on the task at hand. For example, enterprise users may use a SQL application to tap into relational databases or a document management application to access documents pertinent to their work.

Controlling access to sensitive information contained within these repositories is typically enforced by the managing software programs. The extent to which the information is secured may vary from system to system, with each enforcing its own security policies and requirements. For example, file systems generally control read, write, and execute operations on files and associate security groups with the allowed operations. A security group may include a single user or multiple users. However, file systems do not control access to individual elements within a file. Once the user is permitted to open a file, the user has access to all of its contents. In contrast to a file system security model, a relational database management system may control access to individual columns of data in a table of a database, and a document management program may enforce security policies to limit access to documents within a specified period of time.

An enterprise search engine may be described as being capable of retrieving relevant documents of the enterprise in response to a query (a form of a search request). The diversity in security models for the different types of enterprise content is problematic for enterprise search engines. A goal of an enterprise search engine is to provide quick and relevant responses to inquiries for documents that users are authorized to see. In order to meet the performance and relevance requirements, most enterprise search engines build a search index that represents the content to be searched. Rather than searching the original content, the user is actually submitting queries to the index, which is like searching a card catalog in a library.

The search index includes documents that are extracted from various backend repositories. A repository may be described as a data source. Backend repositories may be described as contributing data sources to the search index. The documents contained in these backend repositories are extracted with a crawler that has security credentials of sufficient authority to access all of the documents for that repository. Normally, the user identification ("userId") presented to the crawler is a "super" user that has access to most, if not all, of the documents in the repository. Consequently, the initial document access rights of an enterprise search index represent the access rights of this "super" user.

Different enterprise search engines use different approaches to restrict an individual user's access rights. One approach is for the enterprise search engine to provide its own security model. The administrator of the enterprise search engine defines individual access rights to the cataloged documents. This approach has several drawbacks. First, this approach attempts to employ a common security model that will satisfy all of the security requirements of the contributing backend repositories. As previously demonstrated, this may not be practical or possible as the different types of repositories and access controls increases. Typically, the end result is a least common denominator effect for security causing a number of documents to loose some if not all of their native security controls. Second, this approach requires the administrator to redefine controlled access to documents that have already been defined in the originating repositories, which is a duplicative task. Lastly, the approach implies that the administrator has enterprise wide knowledge of the access controls for all enterprise content, which is an unlikely situation.

It is therefore highly desirable for the search engine to honor the access rights of the documents as defined by the native access controls of the backend repository. Native access control refers to the access control implemented at the repository from which the document was retrieved. Typically, a native access control list (ACL) is associated with each document and is used to enforce access control to that document. In many cases, the native ACL includes security tokens representing security groups and/or individual users who have access to a document. Native ACLs may also exist at higher levels than the document within the backend repository. For example, documents may be organized into folders, which themselves may have defined ACLs (i.e., folder level ACLs). The folders, in turn, may be organized into logical file cabinets, which again can have their own defined access controls (i.e., file cabinet level ACLs). There are generally two approaches for a search engine to honor these native ACLs. One approach is to copy the native ACLs into the search index. The other approach is to leave the native ACLs in the backend repository and to have the search engine request document access authority from the repository through impersonation.

The ACL approach is to automatically copy the document's native ACLs as defined by the backend repository into the search index of the enterprise search engine. Although this approach reduces the burden on the administrator to redefine a document's ACL, the approach has several shortcomings. If the native ACLs are to retain their original security model, then the enterprise search engine would be re-implementing the corresponding security mechanisms used by the backend to enforce those ACLs. This may be a daunting task. Alternatively, the search engine could try to transform these ACLs into a single common model so that a single security filtering mechanism may be used. A true normalized model may not be achievable. The term "normalized" may be described as causing to conform to a standard or making consistent. If a normalized model is achievable, the result would be a security model representing the least common denominator of all the contributing repositories.

The impersonation approach does not maintain any security information in the search index at all. In response to a query, a result set is generated from the index. Then, before the result set is presented to the user, the enterprise search engine removes those documents the user is not allowed to see by consulting in real time with the document's originating backend repositories. The enterprise search engine would, in a sense, be impersonating the end user when interacting with the native repository. Through impersonation, the enterprise search engine would be asking the native repository if the user may have access to one or more documents that were previously crawled and extracted from that repository. With this approach, document access is controlled by the native security mechanisms of the originating repository, however complex that may be. Also, the filtering is done in real time, thus reflecting the latest native ACL changes for any given document.

While the impersonation approach does meet the requirement to honor the document's original access rights, the approach has some shortcomings. First, the approach requires connectivity to the all of the backend repositories that have contributed to the index. If a particular backend repository is not available, then the disposition of a document in a result set may not be determined. That is, if the backend is not available then the document probably cannot be viewed. Under this condition the document would automatically be removed from the result set.

The impersonation approach, however, may take some time. Search indexes are optimized for speed and generally can be searched in sub second response times. With the impersonation approach, time is added to communicate with each backend repository to determine whether documents should be included in the final result set that is returned to the user. The more differentiated the result set, the greater the number of communications. The problem is compounded when a user is denied access to the majority of the results. For example, assume that a query generated 1000 interim results ranked by relevance by submitting a query against the index. Further, assume that the user did not have access to the first 900 results as dictated by the backend repositories. Then over 900 impersonations would have been performed by the enterprise search engine before the result set is populated with the remaining 100 results.

Thus, there is a need in the art for more efficient enforcement of native access control to indexed documents.

SUMMARY

Provided are a method, article of manufacture, and system for processing a search request. One or more indexed levels of access control list information are stored in a search index for each document identified in the search index. An interim result set is generated by matching the one or more indexed levels of access control list information associated with each said document to one or more security groups associated with the search request. A final result set is generated from the interim result set by performing impersonation.

BRIEF DESCRIPTION OF THE DRAWINGS

Referring now to the drawings in which like reference numbers represent corresponding parts throughout:

FIG. 4 illustrates a sample screen for collecting user security credentials in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments of the invention.

Figure 1:
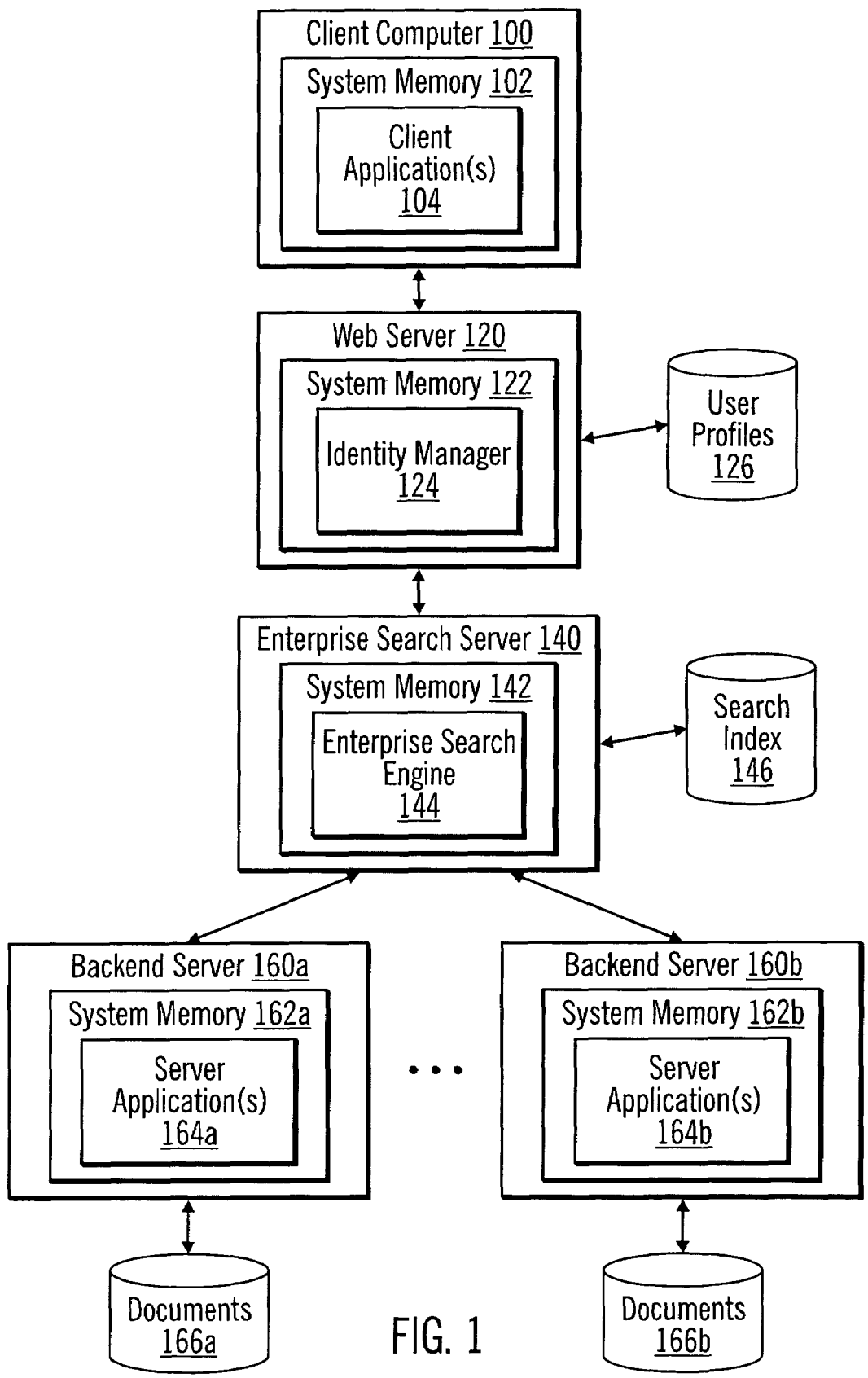
FIG. 1 illustrates details of a computer architecture in which certain embodiments may be implemented.

FIG. 1 illustrates details of a computer architecture in which certain embodiments may be implemented. A client computer 100 is coupled to a web server 120. The client computer 100 includes system memory 102, which may be implemented in volatile and/or non-volatile devices. One or more client applications 104 (i.e., computer programs) are stored in the system memory 102 for execution by a processor (e.g., a Central Processing Unit (CPU)) (not shown).

A web server 120 is coupled to the client computer 100 and to an enterprise search server 140. The web server 120 includes system memory 122, which may be implemented in volatile and/or non-volatile devices. At least an identity manager 124 (i.e., computer program) is stored in the system memory 122 for execution by a processor (e.g., a Central Processing Unit (CPU)) (not shown). The web server 120 is also coupled to a data store that contains user profiles 126.

An enterprise search server 140 is coupled to the web server 140 and to multiple backend servers 160a . . . 160n. The ellipses indicate that any number of backend servers may be coupled to the enterprise search server 140. The enterprise search server 140 includes system memory 142, which may be implemented in volatile and/or non-volatile devices. At least an enterprise search engine 144 (i.e., computer program) is stored in the system memory 142 for execution by a processor (e.g., a Central Processing Unit (CPU)) (not shown). The enterprise search server 140 is also coupled to a data store that contains a search index 146.

One or more backend servers 160a . . . 160b each include system memory 162a . . . 162b, which may be implemented in volatile and/or non-volatile devices. One or more server applications 164a . . . 164b (i.e., computer programs) are stored in each respective system memory 162a . . . 162b for execution by a processor (e.g., a Central Processing Unit (CPU)) (not shown). Each backend server 160a . . . 160b is coupled to a data store that contains documents 166a . . . 166b, respectively.

In alternative embodiments, the computer programs may be implemented as hardware, software, or a combination of hardware and software.

The client computer 100, web server 120, enterprise search server 140, and backend servers 160a . . . 160b may comprise any computing device known in the art, such as a server, mainframe, workstation, personal computer, hand held computer, laptop telephony device, network appliance, etc.

The client computer 100, web server 120, enterprise search server 140, and backend servers 160a . . . 160b may be coupled via a network, such as, for example, a Storage Area Network (SAN), a Local Area Network (LAN), Wide Area Network (WAN), the Internet, an Intranet, etc.

Each data store may comprise an array of storage devices, such as Direct Access Storage Devices (DASDs), Just a Bunch of Disks (JBOD), Redundant Array of Independent Disks (RAID), virtualization device, etc.

Figure 2:
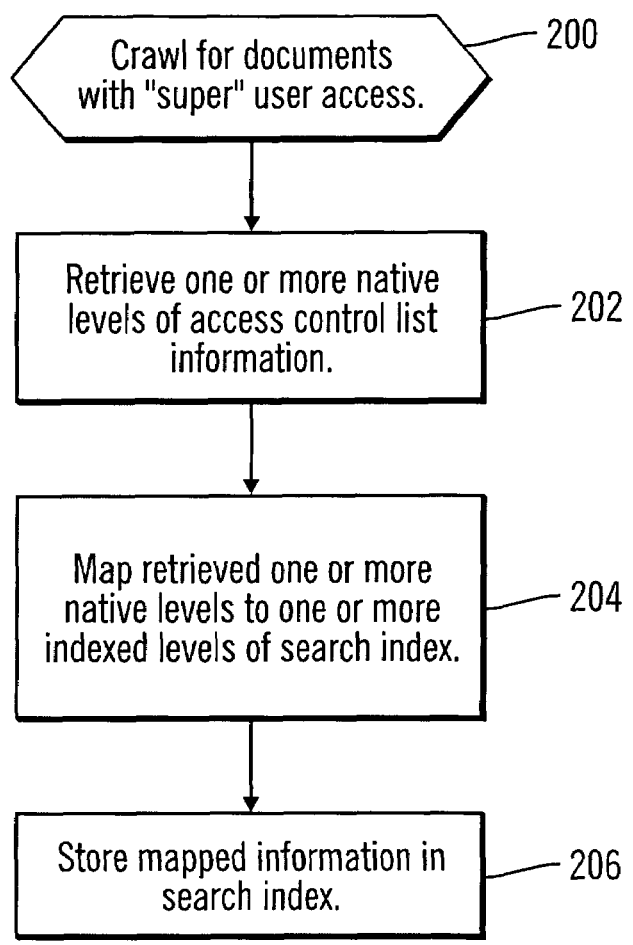
FIG. 2 illustrates logic for creating a search index in accordance with certain embodiments.

FIG. 2 illustrates logic for creating a search index in accordance with certain embodiments. Control begins in block 200 with the enterprise search engine 144 crawling for documents with "super" user access. In block 202, the enterprise search engine 144 retrieves one or more native levels of access control list information from native backend servers, which will be referred to herein as "native levels". In certain embodiments, deny control list information is not captured. The access control list information includes one or more native levels of access control list information. The native levels of access control list information may be, for example, associated with a server, a database, and with each document. In block 204, the enterprise search engine 144 maps the retrieved one or more native levels of access control list information to indexed levels of access control list information stored in the search index 146. The term "indexed levels" refers to the levels of access control information that are associated with the search index 146. For example, the search index 146 may include server and database levels of access control list information. The native and indexed levels may be defined as security groups (e.g., Manager, Staff, Sales). In block 206, the enterprise search engine stores the mapped levels of the access control list information in the search index 146.

The security models at the document level may vary considerably, thwarting any effort to arrive at a common model. But the probability of arriving at a normalized model improves as higher levels of access control list information is considered. For example, many document management systems provide access control at the collection or database level. Other document management systems additionally provide access control at the server or system level through a login authentication process. During crawling, the enterprise search engine 144 selects certain levels of access control list information from the backend server 160a . . . 160b that has a similar semantic for different types of repositories (i.e., a kind of least common denominator set of access control list information). While the higher levels of access control list information does not control access to the individual documents, the information may be used to predict the probability of successful impersonation access to documents. For example, it may be predicted that if a search user has access to a document's database, then the user most likely will have access to the documents in the database.

The higher levels of access control list information is obtained during the document extraction process when the search index 146 is being built or refreshed. The higher levels of access control list information that is retrieved is mapped to one or more indexed levels represented in the search index 146. In certain embodiments, the number of indexed levels in the search index 146 is determined by the intersection of the higher levels of access control list information supported by all contributing backend servers 160a . . . 160b. The normalized high-level access control list information at each indexed level in the search index 146 is used by the enterprise search engine 144 to rapidly produce an interim result set of documents that a search user has a high probability to access. It is this interim result set that the enterprise search engine 144 post filters through impersonation.

In certain embodiments, impersonation involves programmatically establishing a session with the backend server 160a . . . 160b using the security credentials of the search user. Once the backend server 16a . . . 160b authenticates the impersonated user, the enterprise search engine 144 consequently presents to the backend server a list of documents that the end user is potentially authorized to see. The backend server responds to the search engine with indications of denied or granted access to each document.

In certain embodiments, once the user has been authenticated by a host system (i.e., the user has entered a valid userId and password during logon to the web server 120), and before the user issues a search request (e.g., a query) to the enterprise search engine 144, the identity manager 124 is activated. The identity manager 124 is responsible for generating the user's security context, which includes the one or more security groups of which the user is a member and which is used for impersonating the user and for pre-filtering indexed documents based on one or more security groups of which the user is a member. The user's security context contains the user's security credentials to each of the backend repository security domains, as well as the user's associated one or more security groups in those security domains. A security domain may be described as including one or more backend servers 160a . . . 160n that store a collection of documents managed by an enterprise software system. In certain embodiments, a security domain may be made up of more than one repository of a same type, and the user is prompted for credentials for the security domain, rather than for each individual repository in the security domain since the credentials would be the same. In certain embodiments, the security context is a formatted XML string.

Figure 3:
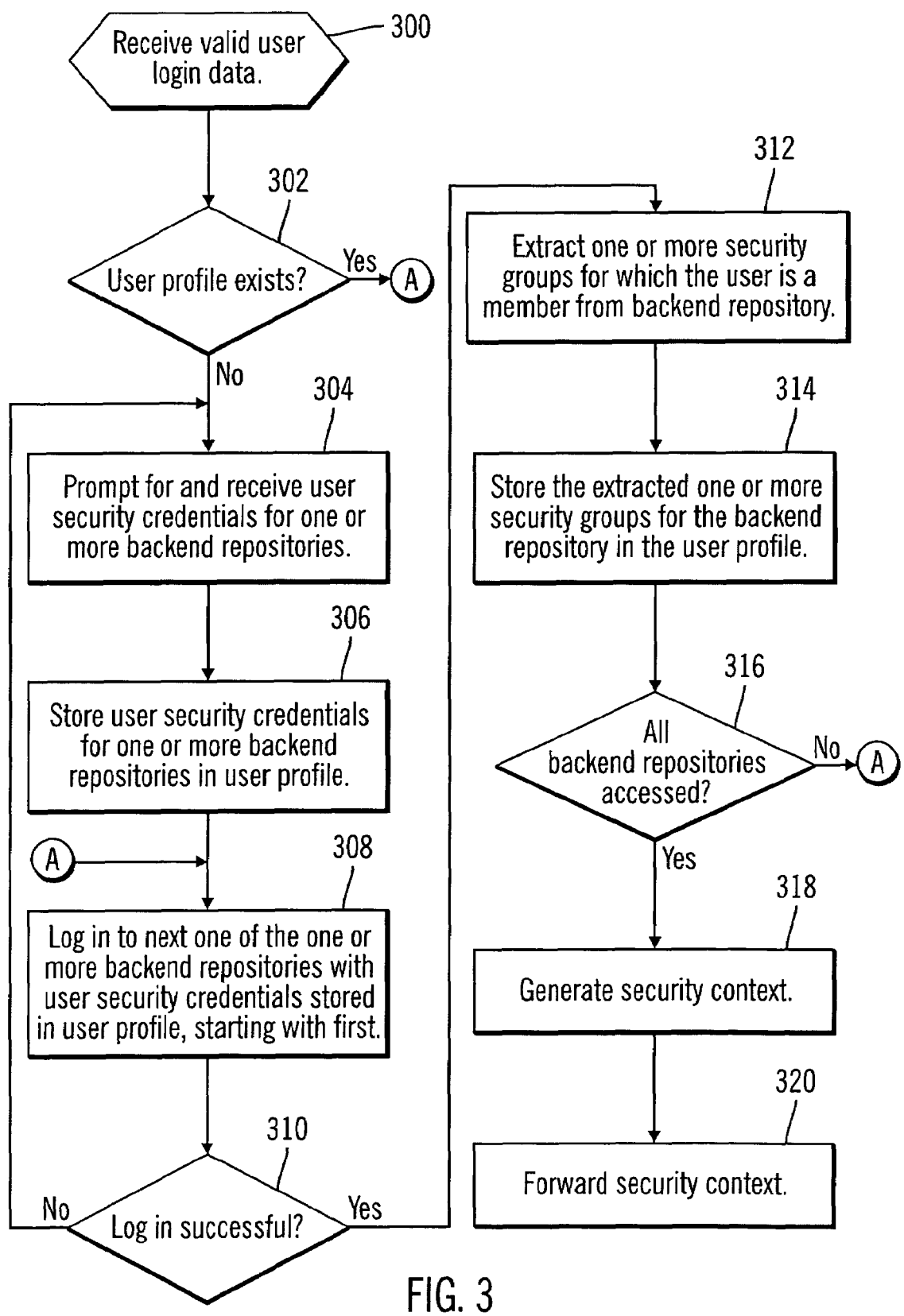
FIG. 3 illustrates logic for creating user profiles in accordance with certain embodiments.

FIG. 3 illustrates logic for creating user profiles in accordance with certain embodiments. A user at the client computer 100 provides login data to a host system (e.g., web server 120) in the form of, for example, a user identifier ("userId") and password combination. In FIG. 3, control begins at block 300 with the identity manager 124 receiving valid user login data (e.g., userId). In block 302, the identity manager 124 determines whether a user profile exists for the user having the received login data. If so, processing continues to block 308, otherwise, processing continues to block 304.

In block 304, the identity manager 124 prompts for and receives user security credentials for one or more security domains that each include one or more backend repositories. In particular, the user submits user security credentials to access documents contained in the data stores at the backend servers 160a . . . 160b to the identity manager 124. A user may have different identities (i.e., different login data) for each of the backend servers 160a . . . 160b and associated security domains. For example, a user may submit a userId and password for each security domain in which the user wants searches executed against indexed documents from those security domains. In block 306, the identity manager 124 stores the user security credentials for one or more backend repositories in a user profile 126. In certain embodiments, for each supplied security credential, the identity manager 124 attempts to log in to the backend repository to obtain the user's one or more security groups for that security domain. If the log in fails, then it is assumed that the user's security credentials have changed (e.g., password expired) and the user is prompted to reenter the correct security credentials. Otherwise the user's one or more security groups are returned by the backend repository and stored in the user's profile. At any time the user may choose to ignore a recommended update to the user profile, but this results in those documents affected by the change being excluded from a search.

In block 308, the identity manager 124 attempts to log in to a next one of the one or more backend repositories with the user security credentials stored in the user profile, starting with a first backend repository from among the one or more backend repositories. In block 310, the identity manager 124 determines whether the log in was successful. If so, processing continues to block 312, otherwise, processing continues to block 304. If the log in was not successful, it is likely that the user's security credentials have changed.

In block 312, the identity manager 124 extracts one or more security groups for which the user is a member from the backend repository, and, in block 314, the identity manager 124 stores the extracted one or more security groups for the backend repository in the user profile. In block 316, the identity manager 124 determines whether all of the backend repositories for which the user provided user security credentials have been accessed. If so, processing continues to block 318, otherwise, processing loops back to block 308.

In block 318, the identity manager 124 generates a security context using the user profile 126. In block 310, the identity manager 124 makes the security context available to the client application 104, which in turn appends the security context to each search request forwarded to the enterprise search engine 144.

In certain embodiments, the identity manager 124 uses a Lightweight Directory Access Protocol (LDAP) user registry to store user profiles. The identity manager 124 stores the multiple user security credentials for a user underneath the user's existing person entry in the LDAP user registry. The location and structure of the LDAP user registry is provided to the identity manager 124 via, for example, a user interface provided by embodiments. When LDAP is used, the user initially logs into the web server 120 by providing a userId and password as registered in LDAP. The identity manager 124 uses the received userId to locate a user record in LDAP or to add user security credentials to a user record in LDAP.

FIG. 4 illustrates a sample screen 400 for collecting user security credentials in accordance with certain embodiments. The screen 400 includes an "LDAP login security credentials" portion 410 and "Repository login security credentials" portion 420. Initially, to create or update a user profile, the user logs in using a userId 412 and password 414. The user can indicate to the system if it is to remember the password and thus bypass the login procedure on subsequent tries. Once the user has logged in, the identity manager prompts the user to enter user security credentials in the "Repository login security credentials" portion 420 of the screen 400. The "Repository login security credentials" portion 420 includes an enable search for indicator 422 that may be checked to indicate that an associated domain is available for search when the user submits search requests to the enterprise search engine 144. The "Repository login security credentials" portion 420 also includes a list of domains 424. In certain embodiments, the list of domains 424 (e.g., ibm or ENTERPRISE SEARCH) is calculated based on the collections available to the enterprise search engine 144 and the documents within those collections that require authorization. The "Repository login security credentials" portion 420 includes fields for user name 426 and password 428 for each domain 424.

A collection may be made up of documents that were crawled from many different types of backend repositories. For example, a collection could contain documents that were crawled from a file system and several databases. The identity manager 124 differentiates between different types and prompts for the security credentials needed to access these separate security domains.

In certain embodiments, by default, each credential is enabled for search, and, thus requires the user to provide a corresponding user name and password. If the user has forgotten a user name and/or password to a particular domain, the user can choose to disable the domain from search (i.e., uncheck the enable search indicator box). This prevents any secured documents in those domains from being searched and returned in a result set.

Figure 5:
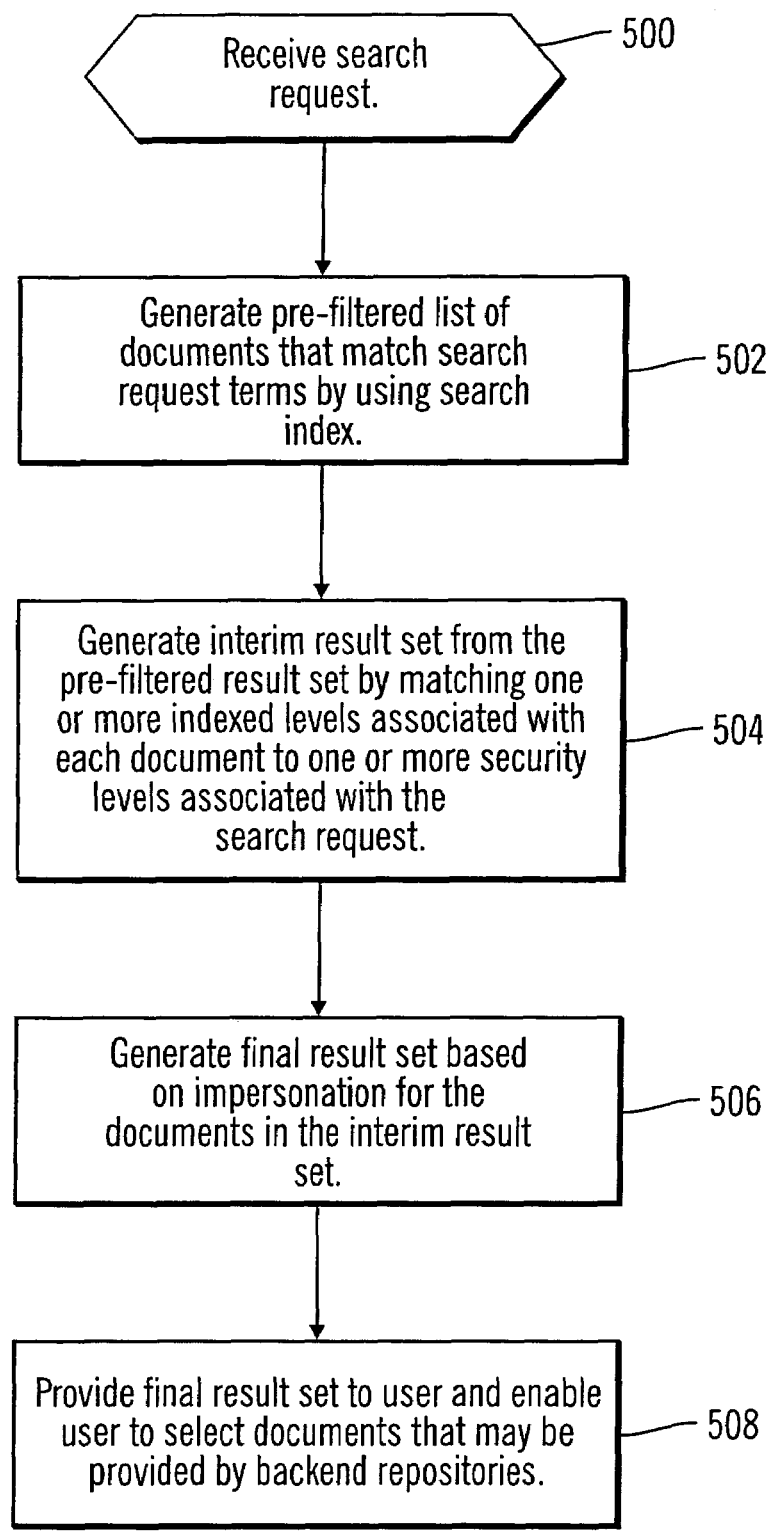
FIG. 5 illustrates logic performed by an enterprise search engine in accordance with certain embodiments.

FIG. 5 illustrates logic performed by the enterprise search engine 144 in accordance with certain embodiments. Control begins at block 500 with the enterprise search engine 144 receiving a search request. In block 502, the enterprise search engine 144 generates a pre-filtered list of documents that match the search request terms as determined using the search index 146. In block 504, the enterprise search engine 144 generates an interim result set from the pre-filtered list of documents that satisfy the search criteria in the search request by matching one or more indexed levels associated with each document to one or more security groups associated with a search request (e.g., to one or more security groups of which the user is a member for each security domain). In certain embodiments, the one or more security groups are associated with a user who issued the search request.

In block 506, the enterprise search engine 144 generates a final result set based on impersonation for the documents in the interim result set. In particular, the enterprise search engine 144 requests the backend server 160a . . . 160b to check access to a document through impersonation. Impersonation involves establishing a session with the backend server 160a . . . 160b using the security credentials of the search user. The backend server 160a . . . 160b may believe it is interacting directly with the user and may consequently respond with data the end user is authorized to access. However, the backend server 160a . . . 160b is communicating with the enterprise search engine 144 impersonating the user.

To impersonate a user, the enterprise search engine 144 obtains the security credentials of the user from the user's security context accompanying the search request. The security context includes the user's login information for each backend server 160a . . . 160b. Just as the user would be asked to provide identification to the original backend server 160a . . . 160b in order to perform a search and access documents, the enterprise search engine 144 provides the same security credentials for any documents contained in the search index that require authorization. In certain embodiments, the identity manager 144 retrieves the security context for the user when the user establishes a session with the enterprise search engine 144. The security context may then be used repeatedly on subsequent searches by the user. In certain embodiments, all security credentials for that user are supplied on each individual search because it is not known in advance which backend servers 160a . . . 160b may be impersonated.

In block 508, the enterprise search engine 144 provides the final result set to a user and enables the user to select documents that may then be provided by backend servers 160a . . . 160b.

Thus, embodiments provide a technique that responds to a search request with those documents a search user is permitted to see as defined by the native access controls of the documents that are indexed. Embodiments combine the storage of higher levels of access control list information in the search index 146, along with the real-time consultation of the originating backend servers 160a . . . 160b to determine which documents a user may access. The storage of higher levels of access control list information in the search index 146 enables good search performance, and, with impersonation, the host software of a document's originating backend server 160a . . . 160b becomes the final arbiter as to whether or not the user is allowed access to that particular document. Thus, techniques enforce native access control list information.

Figure 6:
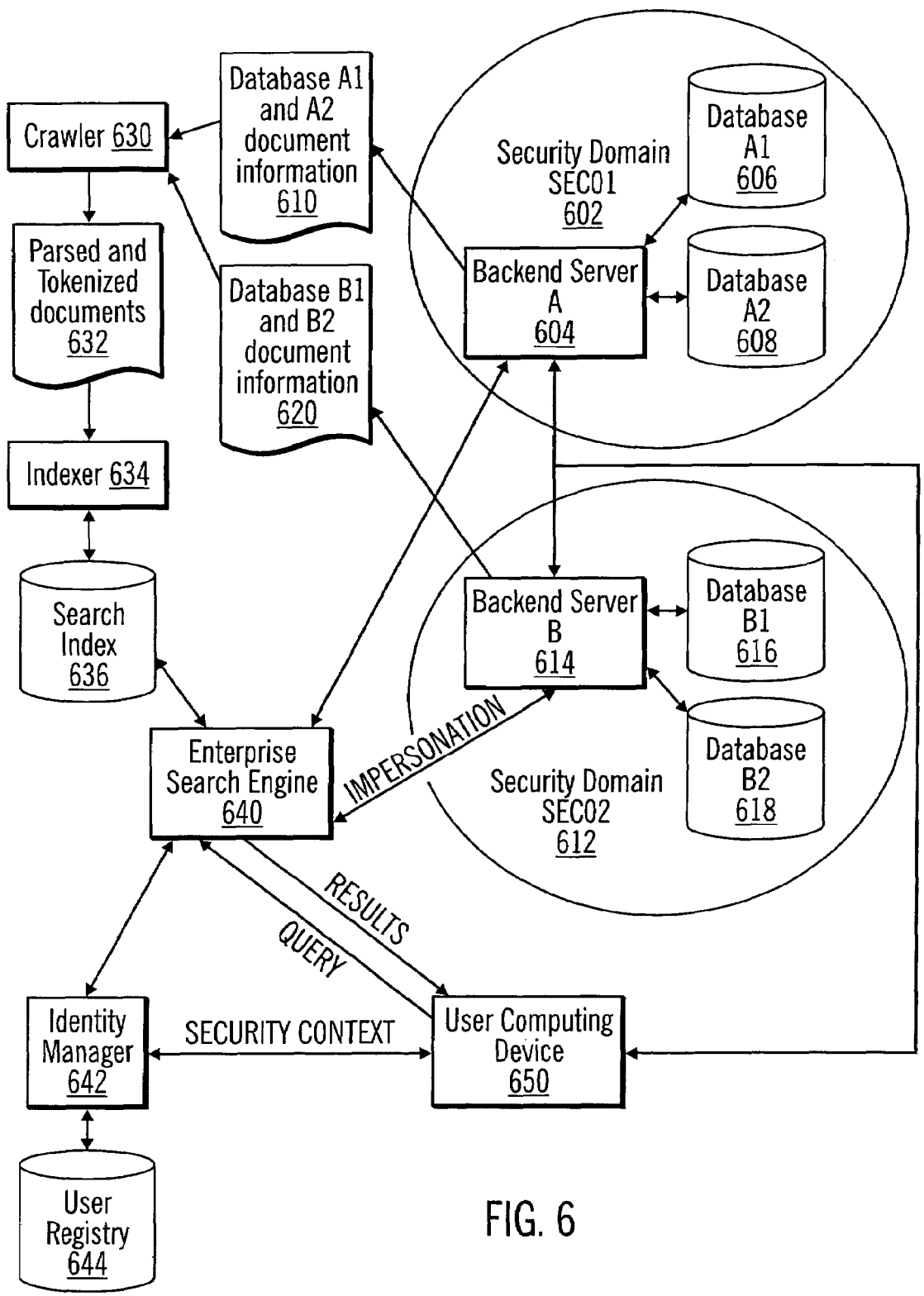
FIG. 6 illustrates an architecture in accordance with certain embodiments.

FIG. 6 illustrates architecture in accordance with certain embodiments. In FIG. 6, a backend server A 604 is part of a security domain SEC01 1602 and includes database A1 606 and database A2 608. A backend server B 614 is part of a security domain SEC02 612 and includes database B1 616 and database B2 618. The backend server A 604 and backend server B 614 provide access to documents with n native levels of normalized access control list information. A security domain may be described as a collection of documents managed by an enterprise software system and its corresponding security mechanisms. In this example, each backend server 604, 614 maintains its own access control lists and authenticates its users separately.

The document extraction process is commonly referred to as crawling and is performed by a crawler 630. The crawler 630 retrieves the actual content of the document, as well as, any meta data about the document (e.g., author, date created, etc.). This information is parsed and indexed by the enterprise search engine 144. Typically, the search index 146 contains a highly compressed cross reference of all the words in the document.

In particular, the crawler 630 connects to a backend system with security credentials of sufficient authority to access and extract all of the documents for that repository. Normally, the userId presented to the backend system by the crawler is a "super" user identification that has access to most, if not all, of the documents in the repository. Extracted along with the documents is the repository's higher level (e.g., server and database level) access control list information. The access control list information identifies those users and/or groups of users that are allowed access to documents in the repository. This information is associated with each document and stored in the search index 636 for use by the enterprise search engine 640.

The crawler 630 retrieves document information 610 from database A1 601 and database A2 by accessing backend server A 604. The crawler 630 also retrieves document information 620 from database B1 and database B2 by accessing backend server B 614. A programmatic technique for retrieving the one or more security groups allowed access to this server is available to the crawler 630. The crawler 630 associates the access control list information with each of the crawled documents.

In the example of FIG. 6, the indexed levels are server and database levels, and the native levels of access control list information extracted are server and database level information. Not all backend servers may use the terminology of "server" and "database" level, and not all backend servers support both levels. If at least one level of access control list information is supported by the backend server, the crawler 630 maps the level to the appropriate indexed level stored in the search index 636. For example, many enterprise backend servers provide a user login to the system, and this may be approximated as server level access. As another example, the normalized "database" level is used for those backend servers that further organize their documents into logical collections that may be assigned discrete access control. For example, a document management system may restrict which groups of users have access to which collections under its control. This kind of access control list information may then be mapped to the indexed level associated with the database level in the search index 640.

If only one native level of access control list information may be extracted from a backend server 604, 614, the crawler 630 may map that native level to both the indexed levels of server and database. Then, the search user's user identifier or one or more security groups of which the user is a member is checked against both indexed levels during the processing of a query.

Document content extracted by the crawler 630 is parsed, tokenized, and ingested by the indexer 634 to construct the search index 636. The search index 636 represents the corpus of documents that may be searched and may be optimized for speed and accuracy. The search index 636 is built and periodically refreshed from synthesized document content that is extracted from backend servers 604, 614 (i.e., enterprise repositories). Stored in the search index 636, along with each document, are the multiple levels of access control list information. Since the search index 636 is comprised of documents crawled from many different kinds of backend repositories, the search index 636 may contain access control list information from different security domains.

When a user at a user computing device 650 issues a query to the enterprise search engine 640, the enterprise search engine 640 allows the user to receive a list of references to documents that match the user's search criteria. In particular, a user issues a query to the enterprise search engine 640 from the user computing device 650. The enterprise search engine 640 receives a security context along with the query. In particular, associated with each query submitted to the enterprise search engine 640 is a complete set of user security credentials that the user may have. The multiple identities that a user may have are solicited by the identity manager 642 and stored into a user registry 644.

The enterprise search engine 640 uses the search index 636 to produce pre-filtered results. Then, the enterprise search engine 144 generates an interim result set from the pre-filtered result set by matching one or more indexed levels associated with each document to one or more security levels associated with the user who issued the search request. The enterprise search engine 144 generates a final result set based on impersonation for the documents in the interim result set.

Although the crawler 630, the indexer 634, and the enterprise search engine 640 are illustrated as separate components, these may be combined to form one component.

The user's security credentials for the backend servers 604, 614 may not be the same. A security credential may consist of a user identifier ("userId") representing the user, a password used to authenticate the user, and the user's security group list (i.e., the list of one or more security groups of which the user is a member). Unless both backend servers 604, 614 share a common user registry, any portion of the security credential may vary among different backend servers 604, 614. For example user John Smith may be a member of the Administrator security group as defined in backend server 604, but user John Smith may only be a member of the Staff security group as defined by backend server 614. Even if John Smith were a member of a security group named the same in both backend servers 604, 614, the actual membership between the two security groups could differ. For example, John Smith is a member of the Staff security group as managed by backend server 604, but is not a member of the Staff security group managed by backend server 614. In certain embodiments, the enterprise search engine 640 maintains this distinction by appending the security domain name to each access control list entry in the search index 636.

Table A illustrates native levels of access control list information for documents DA1 and DA2 at the backend servers 604, 614:

TABLE A

| Document Identifier | Backend Server | Domain Name | Original ACL Group List |
|---|---|---|---|
| DA1 | A | SEC01 | Staff, Sales |
| DB1 | B | SEC02 | Staff, Mgr |

In Table A, document DA1 is from backend server A 604, which is in security domain SEC01 602, and includes original access control list information that indicates that users with security levels Staff and Sales may access the document. Document DB1 is from backend server B 614, which is in security domain 612, and includes original access control list information that indicates that users with security levels Staff and Manager may access the document.

Table B illustrates a search index 636:

TABLE B

| Document Identifier | Backend Server | Domain Name | Level 1 (Server) | Level 2 (Database) |
|---|---|---|---|---|
| DA1 | A | SEC01 | Staff, Sales | Sales |
| DB1 | B | SEC02 | Staff, Mgr | Staff |

In Table B, for each document, two indexed levels of information are stored: server level and database level. For each indexed level, for each document, information is stored in the search index 636 to indicate the security level of access a user needs to access the document. For example, to access document DA1, a user needs belong to the Sales security group in order to pass levels one and two of access control stored in the index. For document DB1, a user needs to belong to the Staff security group in order to pass access levels one and two stored in the index.

When a user first establishes a session with the enterprise search system 640, an aggregate of all security credentials for that user is compiled. This set of security credentials represents all of the security domains contained in the search index 636 and is used by the enterprise search engine 640 for generating the interim result set and post filtering with impersonation.

When a user submits a query to the enterprise search engine 640, the query is accompanied by the user's set of security credentials. Table C illustrates user security credentials for backend servers 604, 614.

TABLE C

| Security Domain | UserId | Password | Security Group Membership |
|---|---|---|---|
| SEC01 | JohnSmith | X7fh567 | Staff, Personnel |
| SEC02 | JSmith | EBDCA001 | Staff, Finance |

For example, in Table C, in security domain SEC01, the user identifier is JohnSmith, the password is X7fh567, and the security groups of which the user is a member are Staff and Personnel. Also, in security domain SEC02, the user identifier is JSmith, the password is EBDCA001, and the security groups of which the user is a member are Staff and Finance. These security groups are matched by the enterprise search engine 640 against the indexed levels in the search index 636.

The enterprise search engine 640 uses the security groups of which a user is a member ("security group membership" in Table C) as additional criteria that is to be met when selecting documents that match the user's search criteria. The security groups listed in the user's security credential set may be appended with their respective security domains so as to eliminate conflicts in similar security group names across backend servers. In certain embodiments, for a particular document, if at least one security group in the augmented user's security group list matches at list one security group in each of the levels of access control stored in the index, access is allowed to the document.

Table D illustrates sample documents match a user's query.

TABLE D

| Document ID | Server Level | Database Level |
|---|---|---|
| DA1 | Staff: SEC01, Sales: SEC01 | Staff: SEC01, Sales: SEC01, Mgr: SEC01 |
| DA5 | Mgr: SEC01, Finance: SEC01 | Finance: SEC01 |
| DA7 | Marketing: SEC01 | Marketing: SEC01 |
| DB2 | AllGroups: SEC02 | Finance: SEC02 |
| DB3 | Staff: SEC02, Mgr: SEC02 | Staff: SEC02, Mgr: SEC02 |

In certain embodiments, one level of the indexed levels may be a subset of another one of the indexed levels. For example, in Table D, the database level access control list information may be a proper subset of the server level access control list information and may be used to further restrict which security groups have access to that particular database. Also, it is possible to have an intersection between two sets of access control list information as demonstrated, by document "DA1". Notice that the security group Mgr:SEC01 shows up in the database level access control list information and not the server's access control list information. The administrator of this server probably removed the Mgr:SEC01 security group from the server access control list information, effectively denying access to that server to Managers but did not bother to update each and every database under this server. Also, note for document "DB2" that a security group named "AllGroups:SEC02" exists at the server level access control list information. The token "AllGroups:SEC02" is an identifier of a security group and is treated like any of the other access control list information entries. That is, in certain embodiments, the token is not interpreted literally. So a user that desires access to that server has to belong to a security group named "AllGroups".

In this example, the set of documents of Table D is filtered based on the following Boolean expression (1) of the user's one or more security groups obtained from Table C and results in the documents of Table E:

Server Level ACL Contains (Staff:SEC01 OR Personnel:SEC01 OR Staff:SEC02 OR Finance:SEC02)
AND Database Level ACL Contains (Staff: SEC01 OR Personnel:SEC01 OR Staff:SEC02 OR Finance:SEC02)     (1)

Table provides an example of an interim result set:

TABLE E

| Document ID | Server Level | Database Level |
|---|---|---|
| DA1 | Staff: SEC01, Sales: SEC01 | Staff: SEC01, Sales: SEC01, Mgr: SEC01 |
| DB3 | Staff: SEC02, Mgr: SEC02 | Staff: SEC02, Mgr: SEC02 |

The interim result set of Table E represents those documents that matched the user's query in this example and that the user has access to as calculated by the enterprise search engine 640 at the server and database levels. However, it is still possible that the user is not allowed to see either of these documents as reflected in their originating source systems. The enterprise search engine 640 impersonates the user and consults with each document's backend database 604, 614 to determine whether that document should be included in a final result set.

Each of the documents in Table E originated from different security domains, which require separate impersonations to determine access. The enterprise search engine uses the security domain of the document to look up the appropriate security credentials to be used for impersonation in Table C.

Embodiments provide several enhancements to improve performance of impersonization. For example, the search index is comprised of documents crawled from many different kinds of enterprise backend repositories. Consequently, a result set may contain documents from any one of these backend repositories. When a final result set contains documents originating from different backend repositories, then multi-tasking capabilities of an operating system are employed to perform concurrent execution of the impersonations with each different kind of backend server 160a . . . 160b. Conversely, when a final result set contains multiple documents from the same backend server 160a . . . 160b, then these documents are presented together through the same impersonation process to the backend server 160a . . . 160b. This allows the session establishment and authentication processes to be performed once for this group of documents.

Also, performance is improved by minimizing the number of impersonations that are performed. As previously mentioned, an inordinate number of impersonations may be made when a user is denied access to the majority of the documents in the result set. Embodiments reduce the number of failed impersonations (i.e., impersonations that result in access to one or more documents being denied) through the storage of indexed levels of access control list information (i.e., a normalized set of the native access control list information) for each backend server 160a . . . 160b in the search index 146. The higher levels of access control list information may be used to generate the interim result set, and impersonation is performed on the interim result set. That is, by matching the user's security levels with the indexed levels (e.g., the server and database levels) associated with each document in the interim result set, the documents already have an improved chance of passing the impersonation test.

Embodiments further reduce the number of impersonations that are made by utilizing the page size of the final result set. Typically, a search application presents a response to a query as a sequence of pages. The first page presents, typically, the top most relevant results, and the user may select (e.g., click on a hyperlink) a document in the final result set to view the actual document. Subsequent pages ordered by decreasing relevance are not normally shown, but these may be requested by the user (e.g., by clicking on a desired page number that is displayed with the final result set's first page). Thus, in certain embodiments, when a page is capable if displaying m results, the enterprise search engine 144 performs enough impersonations to display those m results. In order to accomplish this, it may be necessary for the enterprise search engine 144 to maintain a separate offset into the interim result set representing the last successful impersonation that completed a page. It may be insufficient to use the page number requested by the search application to calculate where in the interim result set to start the post filtering.

For example, assume the page size is set to display ten results. Further, assume that thirteen impersonations were performed to fill the first page of ten results (i.e., because three results were filtered out due to denied access). When the next page of the final results set is requested, the enterprise search engine 144 starts impersonating at document 14, rather than document 11.

Additionally, the enterprise search engine 144 may validate a sufficient amount of the interim results to display the requested page with a predefined number of results. For example, if the interim result set contained many results, then the impersonation and check access steps may be a lengthy process. Again, this performance penalty may be substantially improved by validating enough results to complete the requested page (e.g., validating enough results by impersonation to display ten results).

Assume that the interim result set contained over a hundred results that satisfied the user's original query but that the page size is set to a predefined number of results of ten (e.g., by the client application 104). A best case scenario would result in ten impersonations to fill a page that displays ten results. Additional impersonations are performed to replace those documents that failed the impersonation test, but the probability of this is expected to be low and is predicated on the fact that if the user has access to the indexed levels (e.g., server and database levels) associated with a document, then the user has a high probability of being authorized to view the document.

Moreover, rather than reissue the same search for subsequent page requests, the enterprise search engine 144 may cache the interim result set and extract the requested page from the cached results. Caching of the result set improves performance and is optional.

Figure 7:
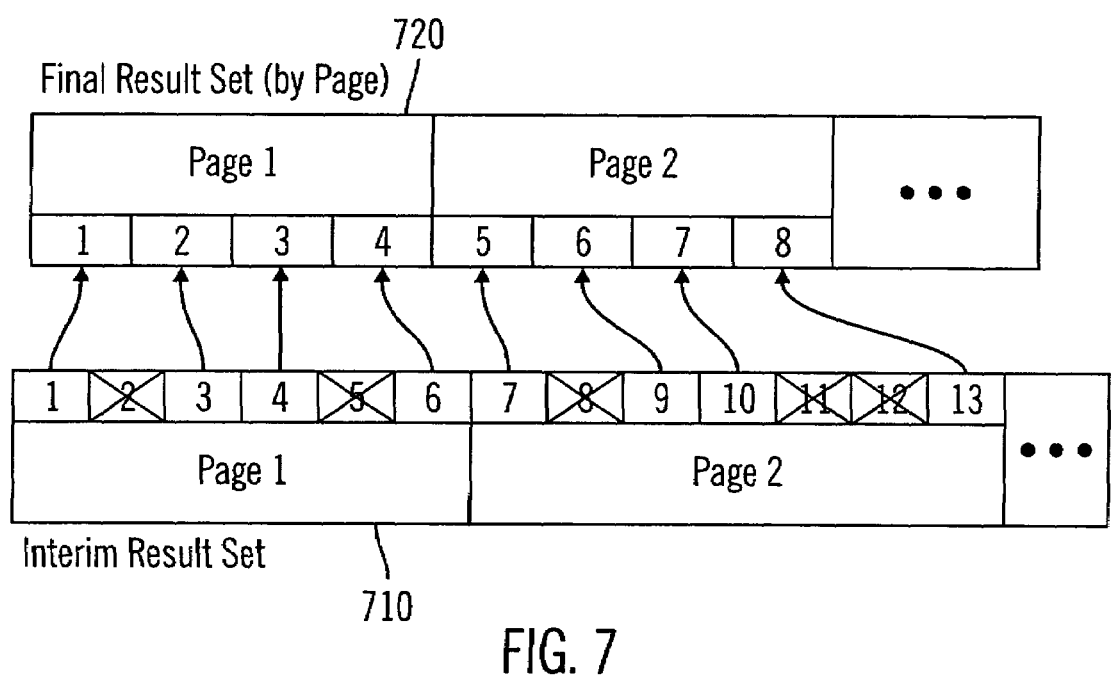
FIG. 7 illustrates an interim result set and a final result set in accordance with certain embodiments.

FIG. 7 illustrates an interim result set 710 and a final result set 720 in accordance with certain embodiments. The enterprise search engine 144 manages the difference in the requested page range and the offset into the interim result set 710 taking into account those results that failed the impersonated check access test. In FIG. 7, each page may display four results. The results in the interim result set 710 that failed their corresponding impersonation test are crossed out with an X mark. Note that six impersonations were required to satisfy the first page of final results (i.e., during impersonation, it was discovered that the user did not have access to documents 2 and 5), and the request for the second page of final results resulted in seven impersonations (i.e., during impersonation, it was discovered that the user did not have access to documents 8, 11, and 13).

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term logic may include, by way of example, software or hardware and/or combinations of software and hardware.

Although some examples herein may have referred to a security group being associated with a user, in alternative embodiments, a security group may be associated with, for example, a computer program. The computer program may then issue a search request having associated one or more security groups that are used to generate an interim result set.

The logic of FIGS. 2, 3, and 5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, and 5 may be implemented in software, hardware, programmable and non-programmable gate array logic or in some combination of hardware, software, or gate array logic.

Figure 8:
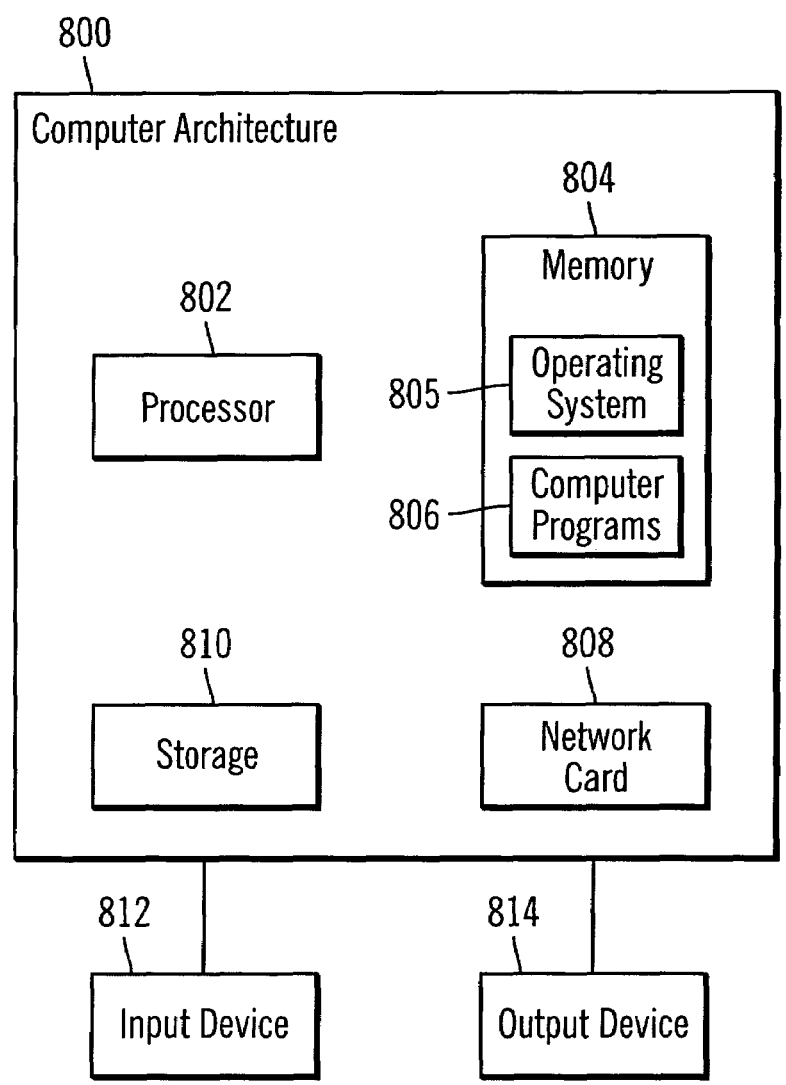
FIG. 8 illustrates an architecture of a computer system that may be used in accordance with certain embodiments.

FIG. 8 illustrates an architecture 800 of a computer system that may be used in accordance with certain embodiments. Client computer 100, web server 120, enterprise search server 140, and/or each backend server 160a . . . 160b may implement architecture 800. The computer architecture 800 may implement a processor 802 (e.g., a microprocessor), a memory 804 (e.g., a volatile memory device), and storage 810 (e.g., a non-volatile storage area, such as magnetic disk drives, optical disk drives, a tape drive, etc.). An operating system 805 may execute in memory 804. The storage 810 may comprise an internal storage device or an attached or network accessible storage. Computer programs 806 in storage 810 may be loaded into the memory 804 and executed by the processor 802 in a manner known in the art. The architecture further includes a network card 808 to enable communication with a network. An input device 812 is used to provide user input to the processor 802, and may include a keyboard, mouse, pen-stylus, microphone, touch sensitive display screen, or any other activation or input mechanism known in the art. An output device 814 is capable of rendering information from the processor 802, or other component, such as a display monitor, printer, storage, etc. The computer architecture 800 of the computer systems may include fewer components than illustrated, additional components not illustrated herein, or some combination of the components illustrated and additional components.

The computer architecture 800 may comprise any computing device known in the art, such as a mainframe, server, personal computer, workstation, laptop, handheld computer, telephony device, network appliance, virtualization device, storage controller, etc. Any processor 802 and operating system 805 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method for processing a search request, comprising:
while crawling for documents, selecting higher levels of access control list information from native levels of access control list information for each document, wherein the selected higher levels of access control list information have a similar semantic for different types of one or more backend repositories, wherein the selected higher levels of access control list information are used to predict a probability of successful impersonation access to the documents, wherein the native levels of access control list information represents access controls implemented at the one or more backend repositories;
mapping the selected higher levels of access control list information to one or more indexed levels of access control list information that are stored in a search index, wherein the indexed levels include a database level and a server level, and wherein, for each of the indexed levels, for each document, information is stored in the search index to indicate a security level of access a user needs to access the document;
generating a pre-filtered list of documents by matching terms of the search request by using the search index;
generating an interim result set of documents from the pre-filtered list of documents by matching the one or more indexed levels of access control list information associated with each said document to one or more security groups associated with the search request, wherein the one or more security groups are associated with a user issuing the search request and who is a member of the one or more security groups;
generating a final result set by performing impersonation for the interim result set of documents by contacting the one or more backend repositories storing the interim result set of documents; and
providing the final result set of documents to the user.

2. The method of claim 1, further comprising:
receiving valid user login data for a user; and
determining whether a user profile exists, wherein an existing user profile stores the one or more security groups associated with the user for use in generating the interim result set.

3. The method of claim 2, further comprising:
in response to determining that the user profile does not exist,
receiving user security credentials for the one or more backend repositories;
storing the user security credentials in the user profile for the user;
for each of one or more backend repositories associated with the user security credentials stored in the user profile;
(1) logging in to said backend repository; and
(2) in response to determining that the log in is successful,
(a) extracting the one or more security groups for which the user is a member from said backend repository; and (b) storing the extracted one or more security groups in the user profile; and generating a security context for the user with the stored one or more security groups.

4. The method of claim 3, further comprising:

in response to determining that the log in is not successful, prompting the user for user credentials to access said backend repository.

5. The method of claim 2, further comprising:

in response to determining that the user profile exists,
for each of one or more backend repositories associated with user security credentials stored in the user profile;
(1) logging in to said backend repository; and
(2) in response to determining that the log in is successful,
(a) extracting the one or more security groups for which the user is a member from said backend repository; and
(b) storing the extracted one or more security groups in the user profile; and
generating a security context for the user with the stored one or more security groups.

6. The method of claim 5, further comprising:

in response to determining that the log in is not successful, prompting the user for user credentials to access said backend repository.

7. The method of claim 1, wherein the user is enabled to select documents that are then provided by the backend repositories.

8. The method of claim 1, further comprising:

when the final result set contains documents originating from different backend repositories, performing concurrent execution of impersonations with each different backend repository.

9. The method of claim 1, further comprising:

when the final result set contains multiple documents from a backend repository, performing a single impersonation for the multiple documents.

10. The method of claim 1, when a page is capable of displaying a predefined number of results and further comprising:

performing one or more impersonations to display the predefined number of results or fewer than the predefined number of results on the page.

11. The method of claim 10, further comprising:

maintaining a separate offset into the interim result set representing a last successful impersonation.

12. An article of manufacture for processing a search request, wherein the article of manufacture comprises a computer readable storage medium that stores instructions, and wherein the article of manufacture is operable to:

while crawling for documents, select higher levels of access control list information from native levels of access control list information for each document, wherein the selected higher levels of access control list information have a similar semantic for different types of one or more backend repositories, wherein the selected higher levels of access control list information are used to predict a probability of successful impersonation access to the documents, wherein the native levels of access control list information represents access controls implemented at the one or more backend repositories;

map the selected higher levels of access control list information to one or more indexed levels of access control list information that are stored in a search index, wherein the indexed levels include a database level and a server level, and wherein, for each of the indexed levels, for each document, information is stored in the search index to indicate a security level of access a user needs to access the document;

generate a pre-filtered list of documents by matching terms of the search request by using the search index;

generate an interim result set of documents from the pre-filtered list of documents by matching the one or more indexed levels of access control list information associated with each said document to one or more security groups associated with the search request, wherein the one or more security groups are associated with a user issuing the search request and who is a member of the one or more security groups;

generate a final result set by performing impersonation for the interim result set of documents by contacting the one or more backend repositories storing the interim result set of documents; and provide the final result set of documents to the user.

13. The article of manufacture of claim 12, wherein the article of manufacture is operable to:

receive valid user login data for a user; and determine whether a user profile exists, wherein an existing user profile stores the one or more security groups associated with the user for use in generating the interim result set.

14. The article of manufacture of claim 13, wherein the article of manufacture is operable to:

in response to determining that the user profile does not exist,
receive user security credentials for the one or more backend repositories;
store the user security credentials in the user profile for the user;
for each of one or more backend repositories associated with the user security credentials stored in the user profile;
(1) log in to said backend repository; and
(2) in response to determining that the log in is successful,
(a) extract the one or more security groups for which the user is a member from said backend repository; and
(b) store the extracted one or more security groups in the user profile; and
generate a security context for the user with the stored one or more security groups.

15. The article of manufacture of claim 14, wherein the article of manufacture is operable to:

in response to determining that the log in is not successful, prompt the user for user credentials to access said backend repository.

16. The article of manufacture of claim 13, wherein the article of manufacture is operable to:

in response to determining that the user profile exists,
for each of one or more backend repositories associated with user security credentials stored in the user profile;
(1) log in to said backend repository; and
(2) in response to determining that the log in is successful,
(a) extract the one or more security groups for which the user is a member from said backend repository; and
(b) store the extracted one or more security groups in the user profile; and generate a security context for the user with the stored one or more security groups.

17. The article of manufacture of claim 16, wherein the article of manufacture is operable to:
in response to determining that the log in is not successful, prompt the user for user credentials to access said backend repository.

18. The article of manufacture of claim 12, wherein the user is enabled to select documents that are then provided by the backend repositories.

19. The article of manufacture of claim 12, wherein the article of manufacture is operable to:
when the final result set contains documents originating from different backend repositories, perform concurrent execution of impersonations with each different backend repository.

20. The article of manufacture of claim 12, wherein the article of manufacture is operable to:
when the final result set contains multiple documents from a backend repository, perform a single impersonation for the multiple documents.

21. The article of manufacture of claim 12, when a page is capable of displaying a predefined number of results and wherein the article of manufacture is operable to:
perform one or more impersonations to display the predefined number of results or fewer than the predefined number of results on the page.

22. The article of manufacture of claim 21, wherein the article of manufacture is operable to:
maintaining a separate offset into the interim result set representing a last successful impersonation.

23. A system for processing a search request, comprising:
a processor; and
hardware logic causing operations to be performed, the operations comprising:
while crawling for documents, selecting higher levels of access control list information from native levels of access control list information for each document, wherein the selected higher levels of access control list information have a similar semantic for different types of one or more backend repositories, wherein the selected higher levels of access control list information are used to predict a probability of successful impersonation access to the documents, wherein the native levels of access control list information represents access controls implemented at the one or more backend repositories;
mapping the selected higher levels of access control list information to one or more indexed levels of access control list information that are stored in a search index, wherein the indexed levels include a database level and a server level, and wherein, for each of the indexed levels, for each document, information is stored in the search index to indicate a security level of access a user needs to access the document;
generating a pre-filtered list of documents by matching terms of the search request by using the search index;
generating an interim result set of documents from the pre-filtered list of documents by matching the one or more indexed levels of access control list information associated with each said document to one or more security groups associated with the search request, wherein the one or more security groups are associated with a user issuing the search request and who is a member of the one or more security groups;
generating a final result set by performing impersonation for the interim result set of documents by contacting the one or more backend repositories storing the interim result set of documents; and
providing the final result set of documents to the user.

24. The system of claim 23, wherein the operations further comprise:
receiving valid user login data for a user; and
determining whether a user profile exists, wherein an existing user profile stores the one or more security groups associated with the user for use in generating the interim result set.

25. The system of claim 24, wherein the operations further comprise:
in response to determining that the user profile does not exist,
receiving user security credentials for the one or more backend repositories;
storing the user security credentials in the user profile for the user;
for each of one or more backend repositories associated with the user security credentials stored in the user profile;
(1) logging in to said backend repository; and
(2) in response to determining that the log in is successful,
(a) extracting the one or more security groups for which the user is a member from said backend repository; and
(b) storing the extracted one or more security groups in the user profile; and
generating a security context for the user with the stored one or more security groups.

26. The system of claim 25, wherein the operations further comprise:
in response to determining that the log in is not successful, prompting the user for user credentials to access said backend repository.

27. The system of claim 24, wherein the operations further comprise:
in response to determining that the user profile exists,
for each of one or more backend repositories associated with user security credentials stored in the user profile;
(1) logging in to said backend repository; and
(2) in response to determining that the log in is successful,
(a) extracting the one or more security groups for which the user is a member from said backend repository; and
(b) storing the extracted one or more security groups in the user profile; and
generating a security context for the user with the stored one or more security groups.

28. The system of claim 27, wherein the operations further comprise:
in response to determining that the log in is not successful, prompting the user for user credentials to access said backend repository.

29. The system of claim 23, wherein the user is enabled to select documents that are then provided by the backend repositories.

30. The system of claim 23, wherein the operations further comprise:
when the final result set contains documents originating from different backend repositories, performing concurrent execution of impersonations with each different backend repository.

31. The system of claim 23, wherein the operations further comprise:
  when the final result set contains multiple documents from a backend repository, performing a single impersonation for the multiple documents.

32. The system of claim 23, when a page is capable of displaying a predefined number of results and wherein the operations further comprise:
  performing one or more impersonations to display the predefined number of results or fewer than the predefined number of results on the page.

33. The system of claim 32, wherein the operations further comprise:
  maintaining a separate offset into the interim result set representing a last successful impersonation.

* * * * *